United States Patent
Sweetland

(10) Patent No.: US 10,007,566 B1
(45) Date of Patent: Jun. 26, 2018

(54) MESSAGE ORDERING AND IDEMPOTENCY ENFORCEMENT PROCESS

(71) Applicant: Jesse Sweetland, Pensacola, FL (US)

(72) Inventor: Jesse Sweetland, Pensacola, FL (US)

(73) Assignee: Appriver, LLC, Gulf Breze, FL (US)

( * ) Notice: Subject to any disclaimer, the term of this patent is extended or adjusted under 35 U.S.C. 154(b) by 0 days. days.

(21) Appl. No.: 14/625,679

(22) Filed: Feb. 19, 2015

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |

(52) U.S. Cl.
CPC .............. *G06F 9/546* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 2008/0069098 A1* | 3/2008 | Shah | .................... | G06F 9/544 370/390 |
| 2014/0366039 A1* | 12/2014 | Giannone | ............... | G06F 9/544 719/314 |
| 2016/0134501 A1* | 5/2016 | Timms | ................ | H04L 43/0829 370/252 |

* cited by examiner

*Primary Examiner* — Chat Do
*Assistant Examiner* — William C Wood
(74) *Attorney, Agent, or Firm* — J. Nevin Shaffer, Jr.

(57) ABSTRACT

A message ordering and idempotency enforcement process utilizing at least one computing device ensures the ordered processing of asynchronously received messages and avoids reprocessing of messages that have already been successfully processed, the process receives a message identified by entity ID, message sequence number and content. The process identifies the message according to the entity ID, message sequence number and content and selects selected views of data from a view data repository applicable to the message and then inserts the message in a buffer according to message sequence number for execution of messages in message sequence order. The process then recording the last message processed according to message sequence number for an entity ID within each selected view in the view data repository.

20 Claims, 7 Drawing Sheets

MESSAGE ORDERING AND IDEMPOTENCY ENFORCEMENT PROCESS

FIELD OF THE DISCLOSURE

The present invention pertains to a message ordering and idempotency enforcement process that ensures the ordered processing of asynchronously received messages and avoids reprocessing of messages that have already been successfully processed.

BACKGROUND OF THE INVENTION

In systems with user interfaces, commands are sent to a server in order to effect changes to one or more entities within the system. As the command is processed, the server outputs events that describe the changes made to the entities. These events are then transmitted asynchronously over the network to other systems where they are handled.

Certain systems involve read stores. Read stores are used exclusively for querying (reads) and their schemas are optimized for user interfaces. These differ from traditional relational databases in that data in a read store is denormalized (flattened) and there are few if any constraints. In a read store, the same information is often copied into multiple places to reduce the need for joins or complex queries. Accordingly, read store schemas are often partitioned into multiple views, each of which contains different projections of similar data that is customized to suit a particular user interface. A single event may result in updates to many views within a read store. For example, a read store may have a Customer Search view and a Customer Detail View. The Customer Search view may consist of a single Customer Search Result table, whereas the Customer Detail view may contain the tables Customer Detail, Customer Detail Account, Customer Detail Subscription, Customer Detail Domain, and so on. A Customer Created Event may result in an insert into both the Customer Search Result and Customer Detail tables.

While data in local read stores is not guaranteed to be consistent with the source systems at all times, there is an expectation that they will be eventually consistent once all events arrive and have been processed and any compensating commands have been issued. To ensure eventual consistency, the events that are emitted from an event-sourced system must be processed in the order in which they were applied. However, due to the asynchronous nature of message delivery and other contributing factors such as disk and network latency, published events may be substantially delayed and may not arrive at a subscribing application in the order in which they were published.

In addition to the problem of ensuring in-order processing of asynchronous publications, applications subscribing to event-sourcing systems also generally should include a means to:
1. Avoid re-processing messages that have already been processed (idempotency);
2. Influence whether a message will be redelivered if an error occurs;
3. Accommodate the handling of out-of-order messages;
4. Handle unknown messages;
5. Process a single message for one or more views;
6. Extend or substitute framework components to meet application-specific needs; and
7. Function independently of a service bus or other messaging infrastructure.

Thus, there is a need in the art for a process that addresses the aforementioned problems in a manner that is robust and flexible so as to accommodate a full spectrum of message types and user objectives.

It therefore is an object of this invention to provide a message ordering and idempotency enforcement process for ensuring in-order processing of messages and enforcing idempotency at the same time.

SUMMARY

Accordingly, the message ordering and idempotency enforcement process of the present invention, according to one embodiment, includes utilizing at least one computing device for performing the function of ensuring message ordering and idempotency; the process further including:
  a. a message receiving step, the process passing a message received from a message source to a view manager, the message including an entity ID and message sequence number, where upon receipt of a message the view manager accesses a view data repository of view states, the view states identified by a view ID, an entity ID and the message sequence number of the last message processed for the view state;
  b. a message inspection step, the process identifying the entity ID, the sequence number and message content of the message;
  c. a view selection step, the process identifying and selecting which view or views a message pertains to according to the content of the message as determined by the message inspection step;
  d. a dispatch step, the process sending the message from the view manager to one or more selected views in accordance with the view selection step;
  e. an ordering step, the process including:
(i) a buffer lookup step, the process locating an existing buffer in the view data repository, the existing buffer allocated to store and control the flow of messages related by content to the entity ID and message sequence number to one or more selected views;
(ii) a view data lookup step, the process obtaining data from the view data repository in accordance with the view selection step identifying the last message processed for an entity ID within each selected view;
(iv) a buffer initialization step, the process initializing the existing buffer with the position of the next expected message according to message sequence number for each selected view;
(v) an insertion step, the process inserting the message into the appropriate position according to the message sequence number within the existing buffer for each selected view; and
  e. a processing step, the process processing messages inserted in the existing buffer for each selected view in message sequence order until the buffer is empty; and
  f. a recording step where the last message processed according to message sequence number for an entity ID within each selected view is recorded in the view data repository;
whereby the message ordering and idempotency enforcement process utilizing the at least one computing device, enforces in sequence processing of the message.

In another aspect, the invention further includes, after the insertion step, a waiting step for each selected view, the process waiting until the next expected message according to the message sequence number arrives before proceeding to the processing step.

In one aspect, the invention includes, after the buffer initialization step, in the event that no existing buffer is found, a buffer creation step, the process creating a buffer for each selected view for which no existing buffer is found.

In another aspect, the invention further includes an error detection step, the process including the creation of an error message log where a message that causes an error is recorded in the error message log and in a further aspect, the message sequence number of the error message is used as the last message processed at the recording step.

In a further aspect, the messages pertaining to multiple views are processed independently and concurrently.

In one aspect, at the insertion step, if the message sequence number is less than or equal to the last processed message sequence number in the existing buffer, the message is discarded.

In another aspect, the view or views include separate buffers for messages according to message content such that the message is processed at each separate buffer independently.

In one aspect, the invention further includes a deallocation step after the recording step, the process including removing buffers which contain no waiting messages.

In another aspect, the invention further includes a timer step, the process commencing at the processing step and providing a discrete amount of time for processing a message before the processing step advances to the next expected message according to message sequence number.

According to another embodiment of the invention, a message ordering and idempotency enforcement process includes:

utilizing at least one computing device for performing the function of ensuring message ordering and idempotency;

the process further including:

a. a message receiving step, the process passing a message received from a message source to a view manager, the message including an entity ID and message sequence number, where upon receipt of a message the view manager accesses a view data repository of view states, the view states identified by a view ID, an entity ID and the message sequence number of the last message processed for the view state;

b. a message inspection step, the process identifying the entity ID, the sequence number and message content of the message;

c. a view selection step, the process identifying and selecting which view or views a message pertains to according to the content of the message as determined by the message inspection step;

d. a dispatch step, the process sending the message from the view manager to one or more selected views in accordance with the view selection step;

e. an ordering step including a process including:
(i) a buffer lookup step, the process locating an existing buffer in the view data repository, the existing buffer allocated to store and control the flow of messages related by content to the entity ID and message sequence number to one or more selected views;
(ii) a view data lookup step, the process obtaining data from the view data repository in accordance with the view selection step identifying the last message processed for an entity ID within each selected view;
(iv) a buffer initialization step, the process initializing the existing buffer with the position of the next expected message according to message sequence number for each selected view;
(v) an insertion step, the process inserting the message into the appropriate position according to the message sequence number within the existing buffer for each selected view if that buffer position is empty wherein if that buffer position is not empty the message is discarded; and e. a processing step, the process processing messages inserted in the
existing buffer for each selected view in message sequence order until the buffer is empty or a missing message sequence number is encountered wherein upon encountering a missing message sequence number processing stops until receipt of the next expected message according to message sequence number;

f. a recording step where the last message processed according to message sequence number for an entity ID within each selected view is recorded in the view data repository;

whereby the message ordering and idempotency enforcement process utilizing the at least one computing device, enforces in sequence processing of the message.

In another aspect, the invention further includes, after the insertion step, a waiting step for each selected view, the process waiting until the next expected message according to the message sequence number arrives before proceeding to the processing step.

In one aspect, the invention includes, after the buffer initialization step, in the event that no existing buffer is found, a buffer creation step, the process creating a buffer for each selected view for which no existing buffer is found.

In another aspect, the invention further includes an error detection step, the process including the creation of an error message log where a message that causes an error is recorded in the error message log and in a further aspect, the message sequence number of the error message is used as the last message processed at the recording step.

In a further aspect, the messages pertaining to multiple views are processed independently and concurrently.

In one aspect, at the insertion step, if the message sequence number is less than or equal to the last processed message sequence number in the existing buffer, the message is discarded.

In another aspect, the view or views include separate buffers for messages according to message content such that the message is processed at each separate buffer independently.

In one aspect, the invention further includes a deallocation step after the recording step, the process including removing buffers which contain no waiting messages.

In another aspect, the invention further includes a timer step, the process commencing at the processing step and providing a discrete amount of time for processing a message before the processing step advances to the next expected message according to message sequence number.

Other objects, features and advantages of the present invention will become more fully apparent from the following detailed description of the preferred embodiment, the appended claims and the accompanying drawings in which:

FIG. 3 illustrates the location or creation of a circular buffer;

FIG. 4 illustrates the creation of a pointer to the next expected message sequence number in a buffer;

FIG. 5 illustrates the insertion of a message into the buffer according to its message sequence number;

FIG. 6 illustrates the handling of the message in message sequence order;

FIG. 7 illustrates the updating of the view data repository to reflect the last message sequence number processed;

FIG. 8 illustrates a message processing error and the creation of an error log;

FIG. 9 illustrates the inventive process with more than one view operating concurrently and independently;

FIG. 10 illustrates the processing of a message in order in one view and the storing of an out of sequence message in another view;

FIG. 11 illustrates the discarding by one view of a previously received message by message sequence number;

FIG. 12 illustrates the handling of a single message by multiple views and multiple buffers for a view;

FIG. 13 illustrates the deallocation of buffers after processing of messages is complete.

DETAILED DESCRIPTION OF EMBODIMENTS

Figure 1:
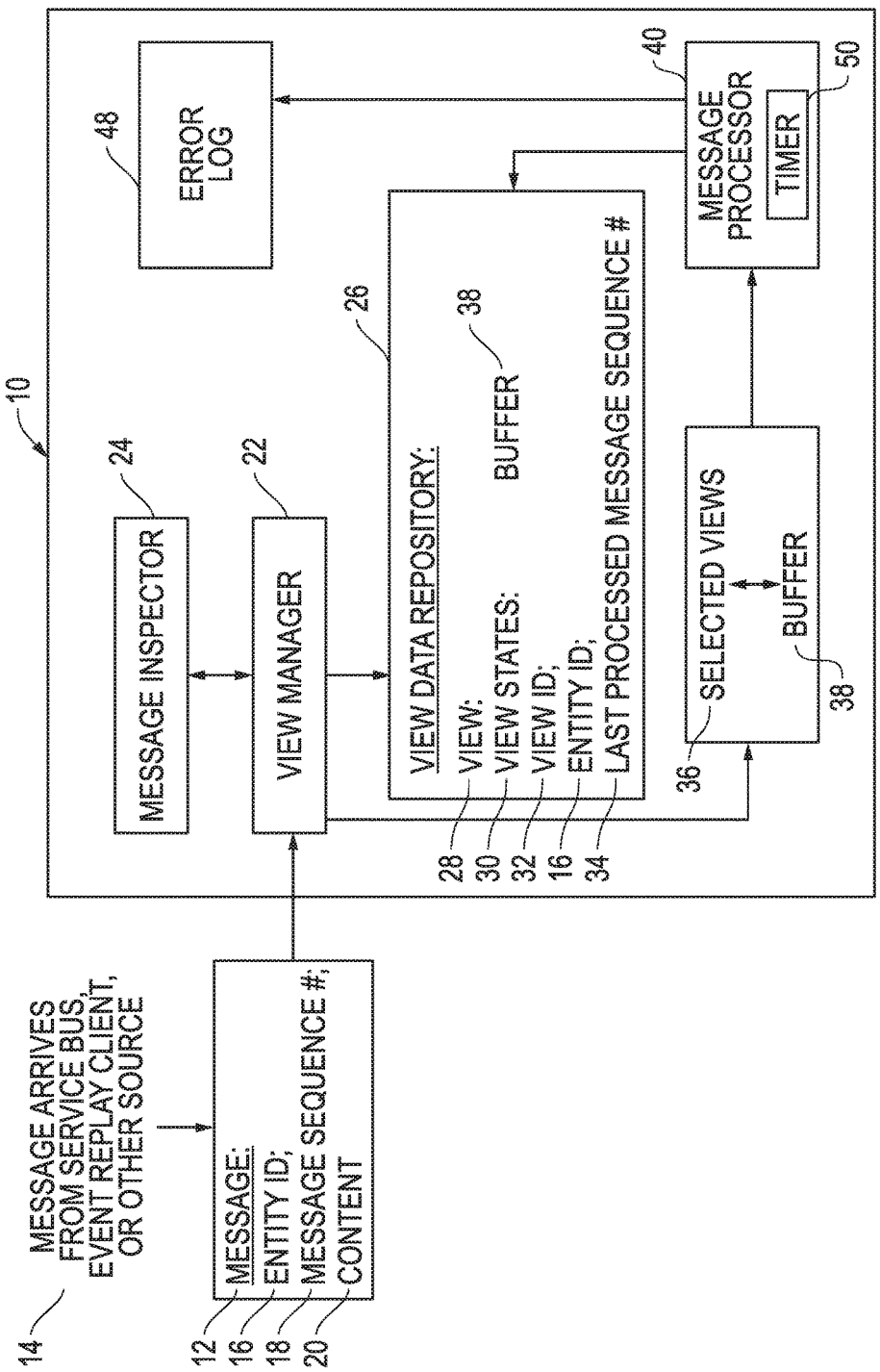
FIG. 1 illustrates a block diagram of the inventive process.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

One embodiment of the present invention is illustrated by way of example in FIGS. 1-13. With specific reference to FIG. 1, message ordering and idempotency enforcement process 10 begins with a message 12 from a message source 14. Message 12 may be any type of message packet, command, email or the like. Message source 14 may be a Service Bus, event replay client or any other source. The message 12 includes an entity ID 16, message sequence number 18 and content 20. Entity ID 16 identifies the entity to whom the message is addressed and may take the form of letters, numbers, characters and the like such that it is possible to discern the addressee of the message. The message sequence number 18 is similar to the entity ID 16 in that it is a number, character or symbol that indicates its position in a stream of consecutive messages. Content 20 is the bulk of the message 12 and may be any form or format.

Message 12 is received by message ordering and idempotency enforcement process 10 by view manager 22. View manager 22 is connected with message inspector 24 and view data repository 26. Message 12 is sent to message inspector 24 where message inspector 24 identifies the entity ID 16 to whom message 12 is addressed as well as the message sequence number 18 and the content 20 of the message 12. With this information view manager 22 consults view data repository 26. View data repository 26 includes a repository of at least one view 28. Each view 28 includes a view state 30. View state 30 includes view ID 32, entity ID 16 and last processed massage sequence number 34 for one particular view 28. A view 28 may include other data.

View manager 22 selects selected views 36 from the view data repository 26. Selected views 36 are a view or views 28 to which message 12 pertains according to the content 20 of the message 12 as determined by the message inspector 24.

View data repository 26 also includes a buffer 38 associated with each view 28. Buffer 38 may be a circular buffer as will be described more fully hereafter. View manager 26 sends message 12 to a buffer 38 associated with a selected view 36. Message 12 is inserted into buffer 38 according to message sequence number 18 where messages 12 are processed by message handler 40 in message sequence order until no further messages 12 are left in the buffer 38 to be processed as will be described more fully hereafter.

Message handler 40, once all the messages 12 have been processed in the buffer 38, then records the last processed message according to message sequence number 18 in the view data repository 26 as the last processed message sequence number 34 for that view state 30.

Referring now to FIGS. 2-13 other features, elements and embodiments of the present invention are described. Applicant's message ordering and idempotency enforcement process 10 is better understood by use of the following examples. However, the following examples are exemplary only and are not meant to limit the scope of the invention disclosed herein.

Figure 2:
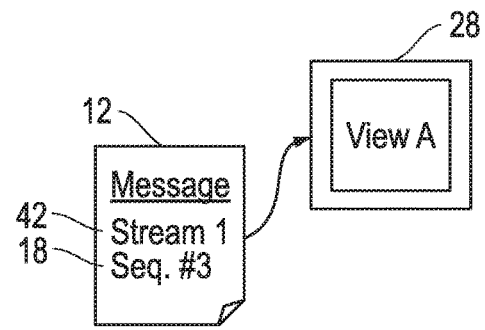
FIGS. 2-13 illustrate the inventive process in a step by step manner beginning at FIG. 2 with the receipt of a message and it routing to a View A.

FIG. 2 illustrates the inventive process beginning with the receipt of message 12 with an entity ID 16. In FIGS. 2-12, entity ID 16 is indicated as a "stream" 42. Stream 42 is a combination of entity ID 16 and message content 20 such that "Stream 1" in FIGS. 2-11 identifies one or more views 28. Message 12 is received and routed to a view 28, View A, as described above. View 28 by way of further description is a self contained set of data that is updated based on a subset of messages received, as described and illustrated. A view 28 can be an in-memory cache, documents in a NaSQL data store; flat files on disk; a relational database; or any other collection of data. According to the inventive process, views 28 can be independently refreshed.

Figure 3:
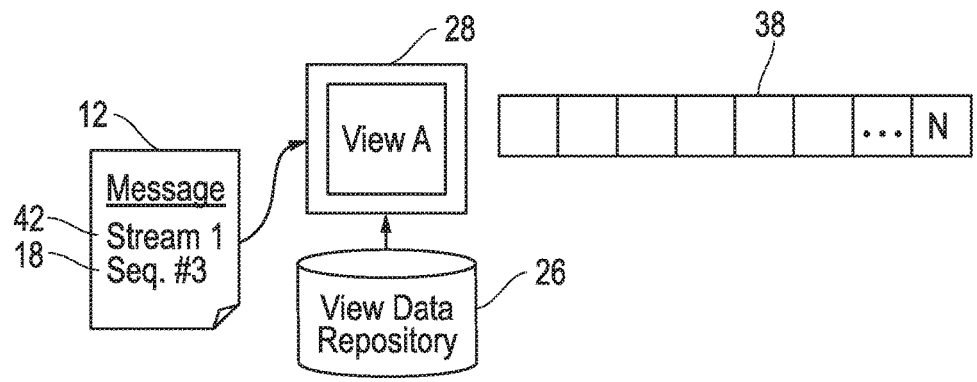

FIG. 3 illustrates the location or creation of a circular buffer 38 in view data repository 26. The first step to create a circular buffer 38 is to retrieve the last processed message sequence number 34 for "Stream 1" in view A from the view data repository 26. The view data repository 26 can be backed by an in-memory cache, documents in a NaSQL data store; flat files on disk; a relational database; or any other means of persisting data regarding the relationships between message streams 42 and views 28. If a view 28 does not currently contain a circular buffer 38, one is created.

Figure 4:
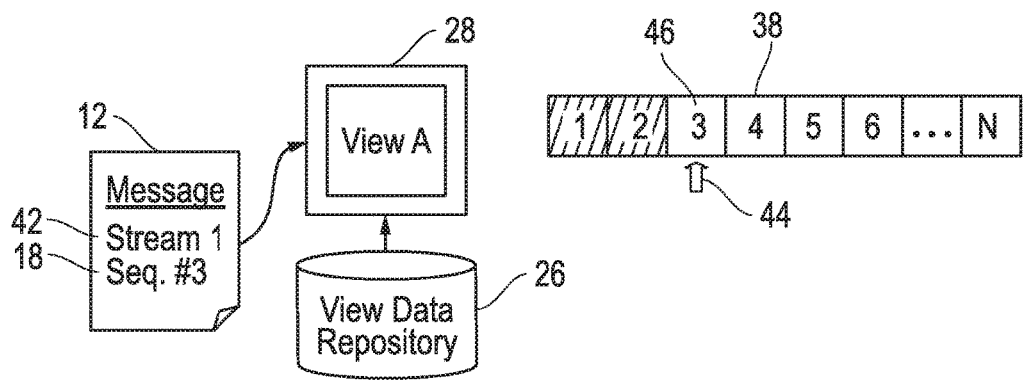

FIG. 4 illustrates the identification of a buffer 38 for Stream 1 and the creation of a pointer 44 to the next expected message sequence number 46 in the buffer 38. The pointer 44 is initialized to point to the next expected message sequence number 46 in buffer 38. Here, the next expected sequence number 46 is number "3" and the pointer 44 so identifies it. For the purposes of illustration buffer 38 numbers "1" and "2" are shown filled in or blacked out to indicate that those message sequence number messages have been received and stored in the buffer 38. Buffer 38 is small relative to the maximum sequence number for each stream 42. Buffer indices may be calculated by taking the modulus of the message sequence number and buffer size, for example.

Figure 5:
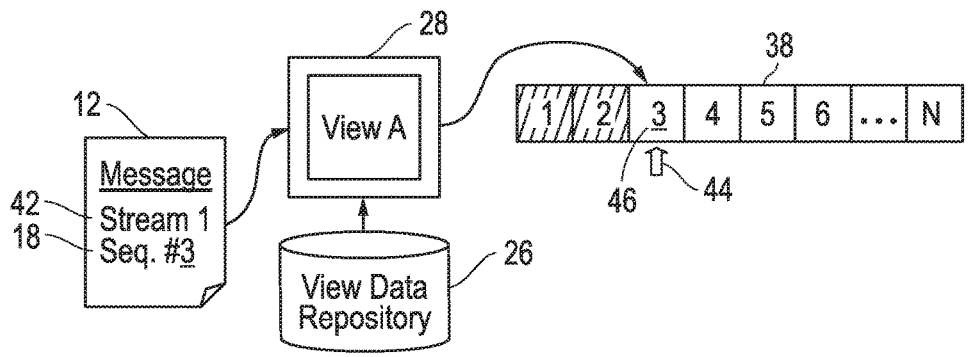

FIG. 5 illustrates the insertion of a message 12 into the buffer 38 according to its message sequence number 18. Thus, message 12 with message sequence number "3" is inserted into the empty buffer space "3". Again, the buffer index may be calculated by taking the modulus of the message sequence number and the buffer size N.

Figure 6:
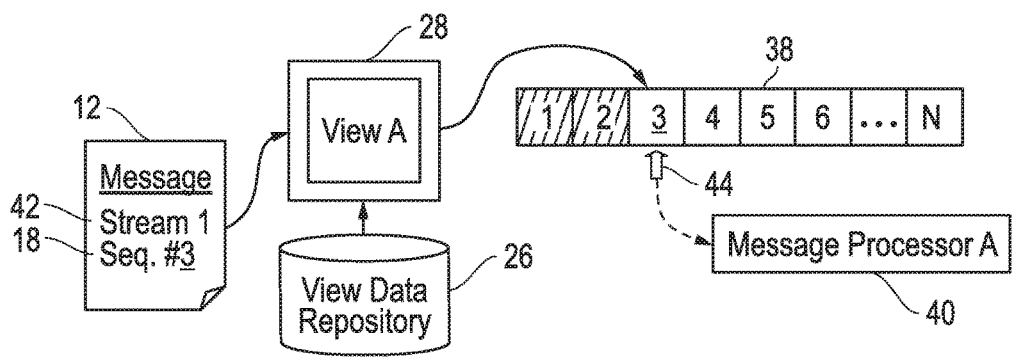

Referring to FIG. 6, the background processing thread, message handler 40, identifies that a message 12 has arrived and the next expected message according to message sequence number 18 has been inserted into the buffer 38. At this point, there is a contiguous sequence of messages in buffer indices "1" to "3" such that the messages 12 are then processed by message handler 40 in message sequence order.

Figure 7:
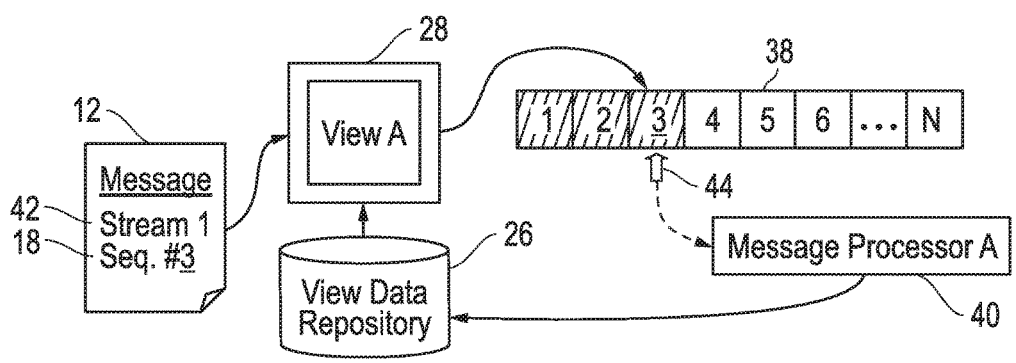

FIG. 7 illustrates the process of the invention in the updating of the view data repository 26 to reflect the last processed message sequence number 34. In FIG. 7, the last processed message sequence number 34 for this message 12 is "3".

Figure 8:
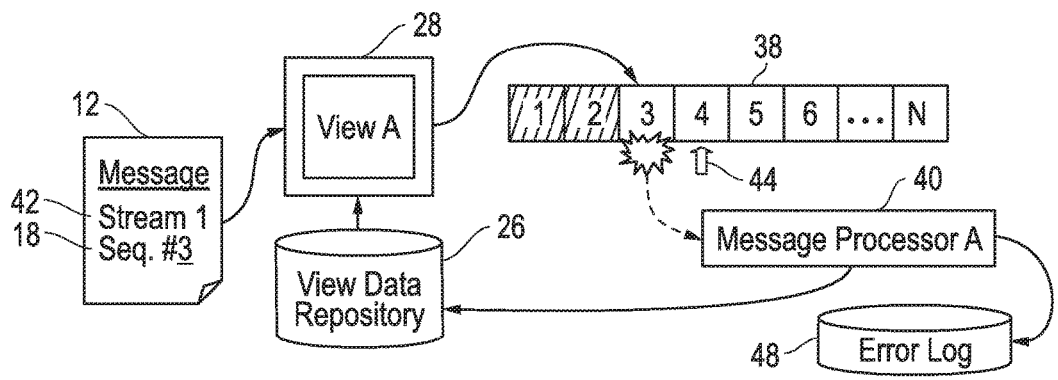

At this point the operation of the present invention has proceeded according to the description of the inventive process set forth above. Beginning with FIG. 8, other features of the invention are disclosed and described. FIG. 8 illustrates how the invention accommodates a message processing error. Here an error occurs while message handler 40 is processing this particular message 12 at position "3". In the case of an error, there are two possibilities for handling the error: halt processing until the error is resolved or proceed with processing. If it is supposed that the message that caused the error is more important than the subsequent messages, then the former would be a good strategy. However, by observation and research Applicants believe that it is more probable that the subsequent messages will in aggregate be more important than the message that caused the error. Further, Applicants submit that the typical expectation is that the occurrence of such errors is likely to be low. Finally, Applicants have determined that the cost of correcting such errors is minimal (typically a one-off DB update).

Thus, in one embodiment, Applicants inventive process adopts the second option which is to record the error prominently and in as much detail as possible and then proceed to the next expected message in message sequence number order. The error is recorded in an error log 46. Further, according to one aspect of the invention, the view data repository 26 is updated to reflect the last processed message sequence number 34 for the stream 42 in the view 28. In the FIG. 8, according to one aspect of the invention, the message handler 40 records the last processed message sequence number 34 as sequence number "3" even though the message did not process because of error.

Figure 9:
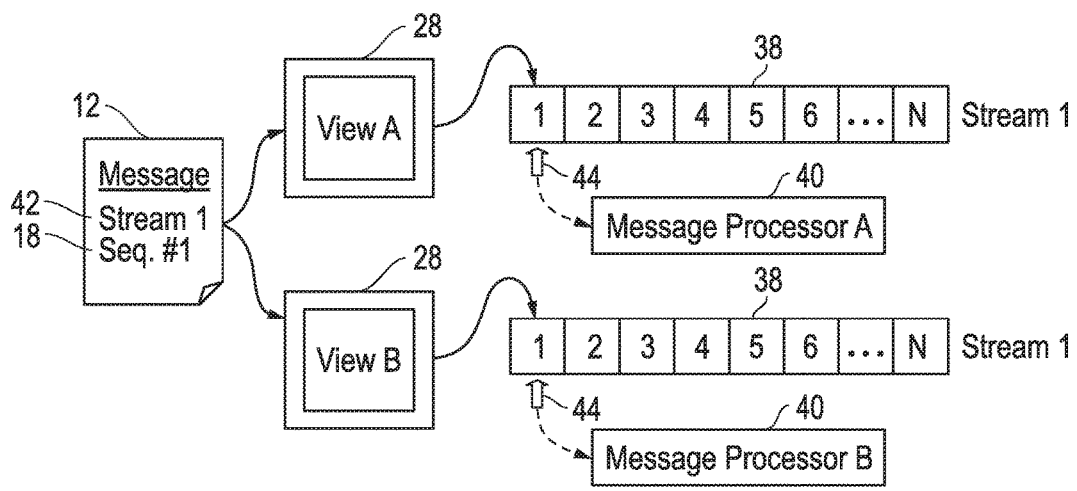

FIG. 9 illustrates the inventive process with more than one view 28 operating concurrently and independently. That is, FIG. 9 illustrates that message 12 stream 42 identifies two separate views 28, view A and view B. Each includes an associated buffer 38 and is processed by message handler 40, either one or more, concurrently and independently.

Figure 10:
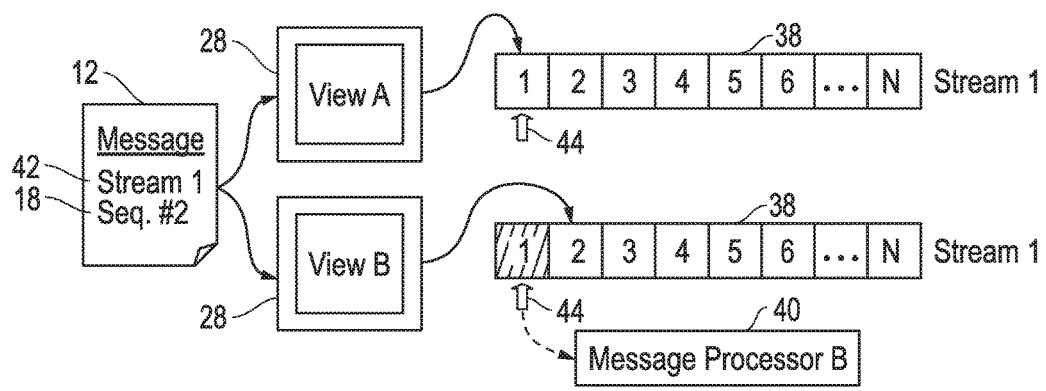

FIG. 10 illustrates the processing of a message 12 in message sequence order in one view 28, view "B", and the storing of an out of sequence message in another view 28, view "A". This illustrates the flexibility of the present invention in that, due to their independent and concurrent operation, it is permitted that messages are ready for processing in some views, view "B", but not others, view "A". That is, in FIG. 10, view "A" receives a message sequence number "2" while it is still waiting for a message with sequence number "1". Meanwhile, view "B" has already received and processed a message with sequence number "1" and may immediately process the message with sequence number "2".

Figure 11:
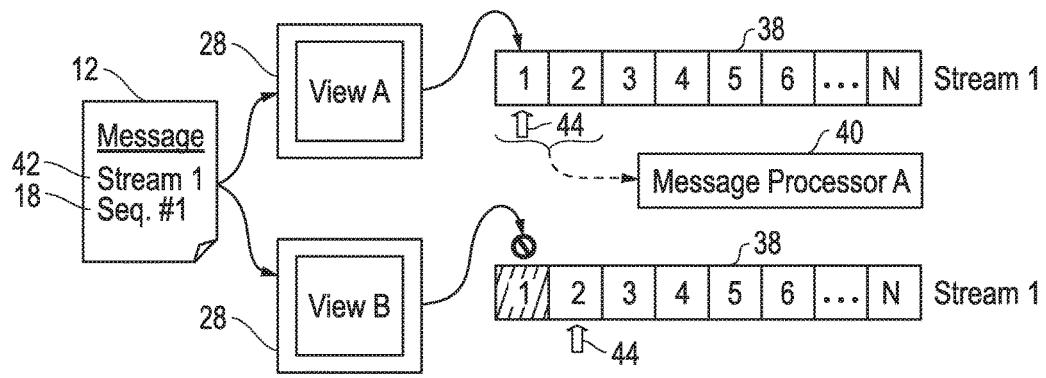

FIG. 11 illustrates the discarding by one view of a previously received message by message sequence number. In this Figure, it is shown that, according to one aspect of the invention, if the sequence number of a message is less than or equal to the last processed message sequence number 34 stored in the view data depository 26, then the message is considered to be a duplicate and is discarded, as at view "B". Here, view "A" has been waiting for a message with sequence number "1" and upon receipt is now able to process both message "1" and previously received out of order number "2" that had been queued. At the same time, view "B" had already received and processed a message with sequence number "1" as reflected by the last processed message sequence number 34 recorded by the message handler 40 in view data repository 26. Thus, when buffer 38 was initiated, pointer 44 identified the next expected sequence number 46 to be number "2" and message sequence number "1" is discarded.

Figure 12:
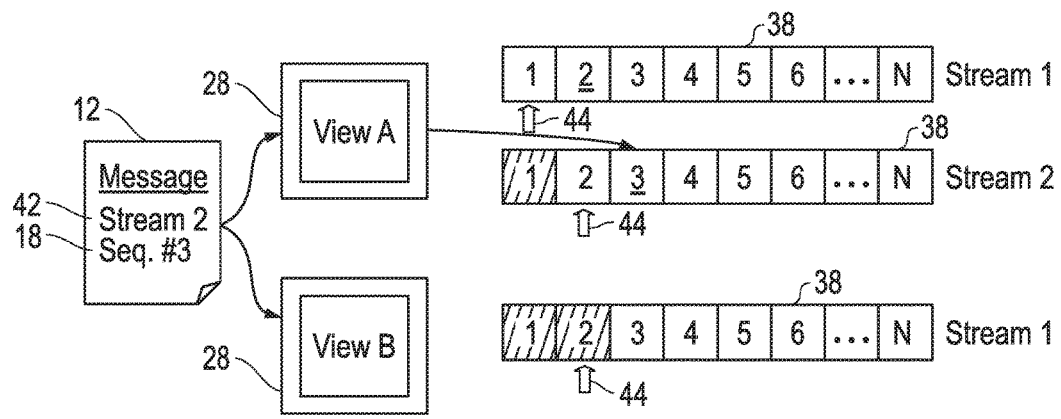

FIG. 12 illustrates the handling of a single message by multiple views and multiple buffers for a view. This example shows concurrent message buffers 38 for multiple streams 42, stream "1" and stream "2", for a single view 28, view "A".

As has been described, view 28 is represented by a view state 30. View state 30 consists, at least, of a view ID 32, and entity ID 16 and a last processed message sequence number 34. Message 12 consists, at least, of an entity ID 16, a message sequence number 18 and content 20. Message inspector 24 identifies appropriate views 28 as selected views 36 by analysis of entity ID 16 and message content 20 or, said another way, by stream 42. Thus, a particular view 28 may include multiple streams 42.

In FIG. 12, view "A" has previously received an out of order message with sequence number "2" for stream "1" and is waiting for a message with sequence number "1" to process. View "A" also had previously received and processed a message with sequence number "1" for stream "2" and is waiting for on sequence number "2". FIG. 12 shows that stream "2" had previously received out of order message sequence number "3" that is stored in the appropriate index pending execution upon the arrival of the next expected sequence number 46, that is number "2" for stream "2".

As shown, view "B", in this example, is not configured to process this particular message and, therefore, does not have a buffer for stream "2". This can be controlled, for example only, by configuring views with message specifications that determine whether the view should process a particular message.

According to one aspect of the invention, message handler 40 includes a timer 50. Timer 50 begins timing upon activation of the message handler 40, for example only and not by way of limitation, and allows message handler 40 a discrete amount of time for processing a message before the message handler 40 processes the next expected message according to message sequence number. Referring to FIG. 12, stream "2" has received message sequence number "3" and is waiting for the next expected sequence number, number "2". Timer 50 ensures that processing of messages 12 is delayed until messages may be processed in sequence order but only for a certain period of time. Again, the determination may be made that the missing of one message is less important than the in order processing of the majority of messages.

Figure 13:
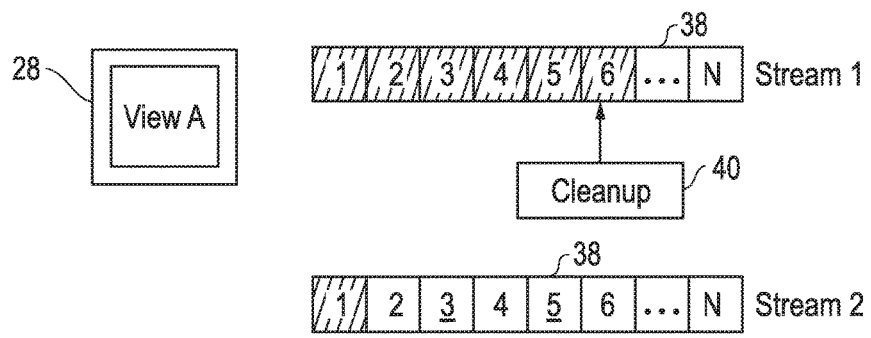

FIG. 13 illustrates the deallocation of buffers 38 after processing of messages 12 is complete. According to this aspect of the inventive process, once the processing step, message handler 40, has completed, buffers that contain no waiting messages are deallocated by a cleanup process. In the Figure, view "A", stream "1" has fully processed message numbers "1", "2" and "3" and no further messages are stored or pending and it is deallocated. In practice, this means that references to the buffer are removed and the runtime garbage collection released memory used for the buffer. Although messages for stream "1" may arrive at some point in the future, there are none waiting now and is it deallocated. As shown, however, stream "2" has messages that have not yet been processed and it remains allocated.

Figure 14:
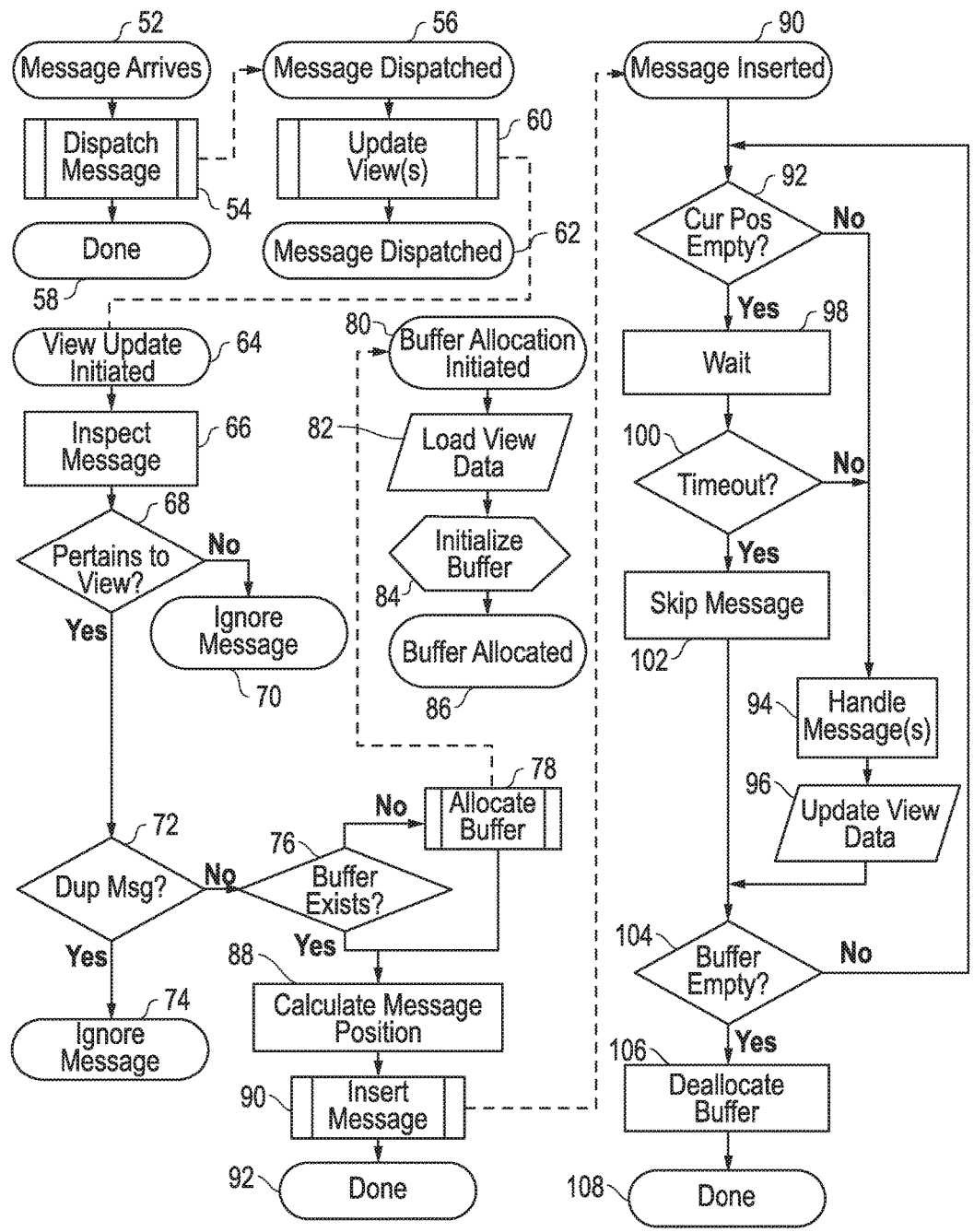
FIG. 14 is a flow chart of the inventive process according to FIGS. 1-13.

Referring now to FIG. 14, for clarification purposes, a flow chart summarizes the inventive process as set forth in detail above and in reference to FIGS. 1-13. The process begins at block 52 with the arrival of a message 12. At block 54 the message 12 is dispatched to block 56 and is done at block 58. At block 60 the view manager 22 identifies view or views 28 that need to be updated and signals each view 28 to perform updates according to the contents of the message 12 and then is dispatched at block 62.

At block 64 view update is initiated in which at block 66 the message is inspected by message inspector 24 to obtain a stream ID 42 and sequence number 18 from the message 12. Each message source 14, again, may implement different mechanisms for identifying and encoding the stream ID 42 and sequence number 18 in its messages.

The stream ID 42 as set forth in detail above, uniquely identifies a series of related messages 12. Within the series of messages, sequence numbers 18 are used to identify the order in which the messages occur relative to that stream ID 42. In one embodiment, a stream ID 42 may correspond to an entity in a database. In another embodiment, the stream ID 42 may identify an aggregate root consisting of multiple entities governed by the same invariant conditions and consistency requirements. Message sources 14 may use Globally Unique Identifiers (GUIDs), integers, strings, or combinations of fields, for example again and not by limitation, to correlate related messages 12. Message sources 14 may, for example again only, use monotonically incrementing integer values, time stamps, or other values with natural or prescribed ordering to identify the ordering of its messages 12.

The message inspector 24 extracts and normalizes these correlation and ordering values from diverse message source 14 formats and produces a standard stream ID 42 and sequence number 18 used to order messages 12 and perform idempotency checks.

At block 68 if the message does not pertain to a view 28 it is ignored at block 70. If it does pertain but is a duplicate message at block 72 it is ignored at block 74. If it is not a duplicate message it is determined at block 76 if a buffer 38 exists. If not, at block 78, a buffer allocation is initiated at block 80. Within each view 28 a buffer 38 is allocated per stream ID 42 to store messages until all preceding messages are received or a timeout 50 occurs thus enabling views 28 to be updated concurrently and at different rates according to the relevance of messages and the order in which they are received.

To initialize a buffer 38, a view 28 must determine the last (highest) sequence number 18 processed for a particular stream ID 42. A View Data Repository 26 provides access to a persistent store of this information at block 82.

A buffer 38 of a configurable size is created and initialized at block 84 and allocated at block 86 so that its current position corresponds to the next sequence number 18 that is expected for the stream ID 42. At block 88, using the output of the message inspector 24 the view 28 determines the position in the buffer 38 at which the message 12 belongs. This position may be at the current position of the buffer 38 or in any position after. At block 90, messages 12 are inserted at block 90, and when that is done finishes at block 92, into a buffer 38 at the calculated position and held until all preceding messages for that stream ID 42 are received or skipped due to timeouts.

According to the inventive process, also included is the process through which messages 12 are removed from the buffer 38 and processed through the configured message handler 40. It may execute in a separate thread from the threads in which messages 12 are inserted into the buffer 38. At block 92, if the current position of the buffer 38 is not empty then the message 12 at that position is handled at block 94 and at block 96 the view data is updated and the buffer position is incremented. That is, upon successful processing of a message 12 the view data repository 26 is used to update the highest or last sequence number 34 processed for the stream ID 42 in that view 28.

If the current position of the buffer 38 is empty then at block 98 processing of the message 12 will be delayed until the missing message 12 is received or a timeout occurs at block 100. If a timeout occurs then the position of the buffer 38 will be incremented at block 102 and the message 12 skipped. If, at block 104, the buffer 38 is empty then, at block 106, the buffer 38 is deallocated at block 106 and message processing concludes at block 108. When a buffer 38 becomes empty then it is deallocated and its resources are reclaimed. If, at block 106, the buffer 38 is not empty the processing continues at block 92 as just described.

The present invention is completely configurable to meet various message processing needs. By way of further description, the present invention addresses several message management issues: transaction management; recovery and message sequencing Transaction Management Previous message management solutions rely on nested transactions to isolate the global application lock concerns from database writes that occur within the message processor. There are a few of drawbacks to this:

A distributed transaction manager, e.g. Microsofts' MS DTC (Distributed Transaction Coordinator) or IBM's XA Transaction, for example, is needed to handle the distributed transaction, which incurs a performance penalty.

The same data source/connection cannot be used for both the idempotency lookups and the actual message processing.

The transactional semantics of the exterior message delivery system (e.g. service bus) are conflated with the transactional semantics of the message idempotency and processing logic, which can have unintended side-effects, such as:

a. If a single message is routed to multiple views, and redelivery is requested by one of those views, then the message will be redelivered to all views due to the nature of the external transaction. Although the messages will not be processed more than once, global locks and queries need to detect the duplicate message delivery have a significant impact on performance.

b. Failures in other message handlers exterior to the denormalization framework can cause redelivery to the denormalizers which incurs the same performance penalty.

c. Conversely, redelivery requests in denormalizers can cause messages to be redelivered to other external handlers which may not be set up to handle multiple deliveries of the same message.

The present invention places a message in a buffer and allows the external transaction to complete. If a message happens to be redelivered it will be discarded immediately since that position in the buffer is already filled. Processing of messages takes place in a separate thread with no ambient transaction, allowing the message processor to enforce its own transaction semantics. In addition, processing of messages does not commence until all intermediate messages have been received. Processing then occurs sequentially until the next empty slot in the buffer is reached. There is no need for redelivery and the overhead involved.

Recovery

Previous message management systems have relied on retry policies to control when and how messages should be redelivered in the event of an error. However in practice Applicants have noticed that there is very rarely a situation in which an error was resolved with a simple retry. The result is that messages would be retried several times over the span of many minutes or hours (depending on the policy) before ultimately giving up and proceeding to the next message. No situation has been identified in which it would be valuable to stop processing messages until the error was identified and correct. On the contrary, Applicants have found that more often than not it is preferable that processing to continue in order to avoid skewing data in the read store even further.

Therefore according to the present invention, a preferred process is to log the failure and continue immediately on to the next message. In the event of an error the options are:

Issue a compensating action so that another message is published and the data corrects itself (basically re-do the missed change). For example, if a CustomerNameChangedEvent fails and the customer record is not updated with the new name, the error can be corrected by changing the customer's name again once the underlying issue has been fixed.

Identify the discrepancy and issue a manual DML query to correct it. As in the example above, the affected tables can be updated with the correct name.

Truncate data in the affected view and replay messages from the source (for event-sourced systems)

These are simple and straightforward fixes that are expected to happen infrequently and will have low impact given that a read store is simply a persistent projection/cache. In exchange the present invention results in performance gains and more consistent throughput of messages.

Message Sequencing Strategies

An important advantage of the present invention relates to the method used to sequence messages. Whereas prior art systems may use nested transactions, global application locks, and constant database reads to enforce message idempotency, the present invention uses a system of buffers, timers, and background processing tasks to achieve the same effect without all the overhead.

By way of comparison, in prior art systems, by way of example, the following representative steps may be found:

1. For each message that arrives:

a. Obtain a global lock representing the combined Stream ID and View ID. This was accomplished by concatenating the two values and requesting an application lock from SQL Server (sp_getapplock).

b. Issue a query against a table to get the last sequence number that was processed.

c. Compare the result of the query to the sequence number of the message.

d. If the message was received out of order, ignore it or request that the message be redelivered at some future time (generally 500 ms-1500 ms delay) depending on the deferral strategy.

e. Otherwise, process the message. If an error occurs, either ignore it or request redelivery depending on the retry strategy.

f. If the message processes without errors, update the database with the sequence number of the message and release the global application lock.

In contrast, Applicants' inventive process does the following:

1. When a message arrives, route it to each view.

2. Within each view, locate the buffer corresponding to the Stream ID on the message. If a buffer does not exist, allocate one:

a. Read the last sequence number processed for the Stream ID+View ID from the View Data Repository.

b. Compute the next buffer position: Add 1 to the value read from the View Data Repository and take the modulus of the result and the length of the buffer.

c. Initialize the next position in the buffer to the result of the modulus operation.

d. Example: Given a buffer with 16 slots and last sequence number of 42, the next position would be: (42+1) % 16=43%16=11.

3. Compute the position of the message within the buffer by taking the modulus of the sequence number and the length of the buffer. If the buffer is currently full (rare, depending on the size of the buffers) request redelivery of the message with some delay.

a. Example: Given a buffer with 16 slots and a message with sequence number 45, the message would be inserted into position: 45% 16=13.

4. Insert the message into the buffer and notify the processor thread that a message has arrived. Concurrently, the processor thread does the following:

1. For each buffer:

a. While there is a message in the next position of the buffer, process the message.

b. Catch and log all errors.

c. Increment the next position in the buffer.

d. Repeat until there is no message waiting in the next position.

e. When all ready messages have been processed for all buffers, de-allocate and free resources for any empty buffers.

f. Yield and wait for a notification that a new message has arrived.

In one aspect, in addition, there is a separate timer that will automatically advance the next position in the buffer after a timeout to ensure that processing of a message stream can continue if a message is lost in transit.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A message ordering and idempotency enforcement process comprising:

utilizing at least one computing device for performing the function of ensuring message ordering and idempotency;

said process further comprising:

a. a message receiving step, said process passing a message received from a message source to a view manager, said message including an entity ID and message sequence number, wherein upon receipt of said message said view manager accesses a view data repository of views, said views identified by a view ID, an entity ID and the message sequence number of the last message processed for a view;

b. a message inspection step, said process identifying the entity ID, the sequence number and message content of said message;

c. a view selection step, said process identifying and selecting which view or views said message pertains to according to the content of the message as determined by the message inspection step;

d. a dispatch step, said process sending said message from said view manager to one or more selected views in accordance with said view selection step;

e. an ordering step including a process comprising:

(i) a buffer lookup step, said process locating an existing buffer in said view data repository, said existing buffer allocated to store and control the flow of messages related by content to the entity ID and message sequence number to one or more selected views;

(ii) a view data lookup step, said process obtaining data from said view data repository in accordance with said view selection step identifying the last message processed for an entity ID within each selected view;

(iii) a buffer initialization step, said process initializing said existing buffer with the position of the next expected message according to message sequence number for each selected view;

(iv) an insertion step, said process inserting said message into the appropriate position according to said message sequence number within said existing buffer for each selected view;

f. a processing step, said process processing messages inserted in said existing buffer for each selected view in message sequence order until the buffer is empty; and g. a recording step wherein the last message processed according to message sequence number for an entity ID within each selected view is recorded in said view data repository;

whereby said message ordering and idempotency enforcement process utilizing said at least one computing device, enforces in sequence processing of said message.

2. The ordering and idempotency process of claim 1 further including after said insertion step, a waiting step for each selected view, said process waiting until the next expected message according to said message sequence number arrives before proceeding to said processing step.

3. The ordering and idempotency process of claim 1 further including after said buffer initialization step, in the event that no existing buffer is found, a buffer creation step, said process creating a buffer for each selected view for which no existing buffer is found.

4. The ordering and idempotency process of claim 1 further including an error detection step, said process including the creation of an error message log wherein a message that causes an error is recorded in said error message log.

5. The ordering and idempotency process of claim 4 wherein the message sequence number of said error message is used as the last message processed at said recording step.

6. The ordering and idempotency process of claim 1 wherein messages pertaining to multiple views are processed independently and concurrently.

7. The ordering and idempotency process of claim 1 wherein at said insertion step, if said message sequence number is less than or equal to the last processed message sequence number in said existing buffer, the message is discarded.

8. The ordering and idempotency process of claim 1 wherein said view or views include separate buffers for messages according to message content such that said message is processed at each separate buffer independently.

9. The ordering and idempotency process of claim 1 further including a deallocation step after said recording step, said process including removing buffers which contain no waiting messages.

10. The ordering and idempotency process of claim 1 further including a timer step, said process commencing at said processing step and providing a discrete amount of time for processing a message before said processing step advances to the next expected message according to message sequence number.

11. A message ordering and idempotency enforcement process comprising:

utilizing at least one computing device for performing the function of ensuring message ordering and idempotency;

said process further comprising:

a. a message receiving step, said process passing a message received from a message source to a view manager, said message including an entity ID and message sequence number, wherein upon receipt of said message said view manager accesses a view data repository of views, said views identified by a view ID, an entity ID and the message sequence number of the last message processed for a view;

b. a message inspection step, said process identifying the entity ID, the sequence number and message content of the message;
c. a view selection step, said process identifying and selecting which view or views said message pertains to according to the content of the message as determined by the message inspection step;
d. a dispatch step, said process sending said message from said view manager to one or more selected views in accordance with said view selection step;
e. an ordering step including a process comprising:
(i) a buffer lookup step, said process locating an existing buffer in said view data repository, said existing buffer allocated to store and control the flow of messages related by content to the entity ID and message sequence number to one or more selected views;
(ii) a view data lookup step, said process obtaining data from said view data repository in accordance with said view selection step identifying the last message processed for an entity ID within each selected view;
(iii) a buffer initialization step, said process initializing said existing buffer with the position of the next expected message according to message sequence number for each selected view;
(iv) an insertion step, said process inserting the message into the appropriate position according to said message sequence number within said existing buffer for each selected view if that buffer position is empty wherein if that buffer position is not empty the message is discarded;
f. a processing step, said process processing messages inserted in said existing buffer for each selected view in message sequence order until the buffer is empty or a missing message sequence number is encountered wherein upon encountering a missing message sequence number processing stops until receipt of the next expected message according to message sequence number, and
g. a recording step wherein the last message processed according to message sequence number for an entity ID within each selected view is recorded in said view data repository;
whereby said message ordering and idempotency enforcement process utilizing said at least one computing device, enforces in sequence processing of said message.

12. The ordering and idempotency process of claim 11 further including after said insertion step, a waiting step for each selected view, said process waiting until the next expected message according to said message sequence number arrives before proceeding to said processing step.

13. The ordering and idempotency process of claim 1 further including after said buffer initialization step, in the event that no existing buffer is found, a buffer creation step, said process creating a buffer for each selected view for which no existing buffer is found.

14. The ordering and idempotency process of claim 11 further including an error detection step, said process including the creation of an error message log wherein a message that causes an error is recorded in said error message log.

15. The ordering and idempotency process of claim 14 wherein the message sequence number of said error message is used as the last message processed at said recording step.

16. The ordering and idempotency process of claim 11 wherein messages pertaining to multiple views are processed independently and concurrently.

17. The ordering and idempotency process of claim 11 wherein at said insertion step, if said message sequence number is less than or equal to the last processed message sequence number in said existing buffer, the message is discarded.

18. The ordering and idempotency process of claim 11 wherein said view or views include separate buffers for messages according to message content such that said message is processed at each separate buffer independently.

19. The ordering and idempotency process of claim 11 further including a deallocation step after said recording step, said process including removing buffers which contain no waiting messages.

20. The ordering and idempotency process of claim 11 further including a timer step, said process commencing at said processing step and providing a discrete amount of time for processing a message before said processing step advances to the next expected message according to message sequence number.

* * * * *